United States Patent [19]

Donkervoort

[11] 4,116,380

[45] Sep. 26, 1978

[54] CONTROL DEVICE FOR A CENTRAL HEATING INSTALLATION

[75] Inventor: Dorotheus Donkervoort, Vlaardingen, Netherlands

[73] Assignee: Eerste Nederlandse Fabriek van Manometers BV, Schiedam, Netherlands

[21] Appl. No.: 760,051

[22] Filed: Jan. 17, 1977

Related U.S. Application Data

[63] Continuation-in-part of Ser. No. 658,560, Feb. 17, 1976, abandoned.

[51] Int. Cl.[2] .................. F24D 3/00; G05D 23/00
[52] U.S. Cl. .................. 237/8 R; 236/91 F; 236/91 R; 237/8 D
[58] Field of Search ............ 236/91 F, 91 R; 237/8 R, 8 B, 8 D

[56] References Cited

U.S. PATENT DOCUMENTS

| | | | |
|---|---|---|---|
| 1,785,425 | 12/1930 | Raymond | 236/91 F |
| 1,901,995 | 3/1933 | Stewart | 236/91 F |
| 2,063,613 | 12/1936 | McCarthy | 236/91 F |
| 2,404,596 | 7/1946 | Roche, Jr. | 236/91 F |
| 3,044,296 | 7/1962 | Boddy | 236/91 F |
| 3,076,606 | 2/1963 | Garvey et al. | 236/91 F |
| 3,530,452 | 9/1970 | Keizer | 236/101 D |

*Primary Examiner*—John J. Camby
*Assistant Examiner*—Henry C. Yuen
*Attorney, Agent, or Firm*—Irvin A. Lavine

[57] ABSTRACT

A device for controlling the heating of a hot water boiler includes a first temperature sensor sensing the temperature of the boiler liquid and operating means adapted to switch a control switch. It also includes an outside temperature sensor to be arranged elsewhere and comprising a liquid-filled reservoir which communicates via a capillary with a tubular coil spring of the control device, which spring also actuates means which are adapted to switch the first switch. The tubular coil spring is arranged to actuate with an outer winding means adapted to change, through this actuation, the relative position of elements of the control switch and hence the temperature at which the control switch is switched under the control of the first temperature sensor. A characteristic feature of this invention is that the outer winding of the tubular coil spring has a plurality of longitudinally spaced coupling elements which can at choice be coupled to one of the means actuated by the outer winding, whereby the effective length of the tubular coil spring can be changed.

8 Claims, 7 Drawing Figures

CONTROL DEVICE FOR A CENTRAL HEATING INSTALLATION

CROSS REFERENCE TO RELATED APPLICATION:

This application is a Continuation-In-Part of application Ser. No. 658,560, filed Feb. 17, 1976, now abandoned.

This invention relates to a control device for controlling a central heating installation and in particular the heating of a hot water boiler.

An object of the present invention is to provide an improved central heating control device, whereby to provide more possibilities of adjustment to other control processes in dependence upon external temperatures.

According to the present invention, there is provided a control device for controlling the heating of a hot water boiler, which comprises a first temperature sensor for sensing the temperature of the boiler water, a control switch, means for switching said control switch, said means being actuated by said first temperature sensor, an outside temperature sensor to be disposed elsewhere, and including a liquid-filled reservoir communicating through a capillary tube with a tubular coil spring of the control device, which tubular coil spring is arranged to actuate with an outer winding means for changing the relative position of the elements of said control switch in response to said actuation, and hence the temperature at which said control switch is switched under the control of the first temperature sensor, characterized in that the outer winding of the tubular coil spring is provided with a plurality of longitudinally spaced coupling elements which can at choice be coupled to one of the means actuated by said outer winding.

In a preferred embodiment of the invention, an inner winding of the tubular coil spring is connected with an adjusting member that is adjustable in various fixed positions. Further preferred features are that the first temperature sensor is a coiled bi-metallic element connected to a shaft, disposed coaxial with it, and arranged to carry one of the cooperating parts of the control switch, and also that said control switch is a reed switch operable by a permanent magnet, the reed switch and an element capable of conducting the magnetic flux, as cooperating parts of the control switch, each being carried by a different movable member, one of which is movable under the control of the first temperature sensor, and the other under the control of the tubular coil spring.

The device according to the invention enables parallel movement of the lines of the control characteristics, but in particular a change in the angle of inclination of these lines, which provides great adaptability of the control behaviour of the device in dependence upon the external temperature to various requirements, which requirements may be correlated to the nature of a building to be heated, and the atmosphere to be provided therein.

The invention will be described in more detail with reference to the accompanying drawings, showing one embodiment of the invention by way of example. In said drawings, FIG. 1 is a longitudinal sectional view of the control device according to the invention on the line I—I in FIG. 4;

Figure 1:
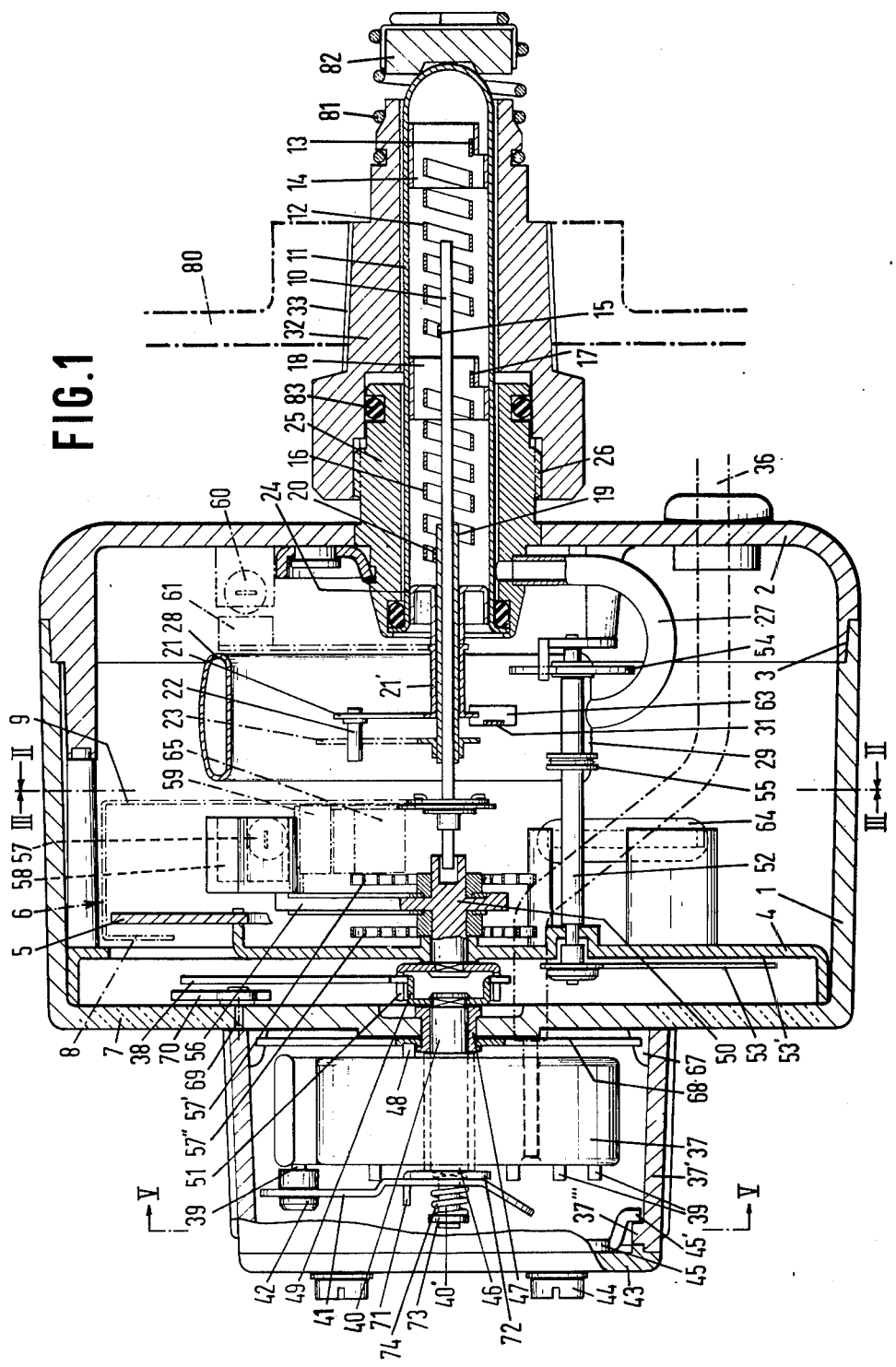

Referring to the drawings, the central part of the control device as shown is a gauge box including a front portion 1 and rear portion 2, secured together with radially engaging edges 3. A dial face 4 is conventionally fixed in the front portion 1. This dial face is slightly set back over its scale portion 5, traversed by a boiler water temperature pointer 6. In front of the dial face the wall of front portion 1 is transparent and formed as an annular window 7.

The boiler water temperature pointer 6 is bent twice perpendicularly and moves with its indicating end 8 over the scale on dial face 4,5 visible through window 7. Longer leg 9 of pointer 6 is mounted on a solid pin 10 extending in the direction of the central axis of box 1,2. On its rear end pin 10 extends into a thin-walled immersion tube 11, which is partly positioned in a boiler 80, diagrammatically shown in part, and wherein a helically wound bi-metallic element 12 is provided. The outer end 13 thereof is secured to the immersion tube wall via a support 14. The other end of the bi-metallic element is secured at 15 to pin 10, and causes pointer 6 to rotate as a result of temperature changes of the boiler water, which thus can indicate the temperature and, as will be described hereinafter, actuate a switch in the energy circuit. Immersion tube 11 further includes a second bi-metallic element 16, the outer end 17 of which is also attached to the immersion tube wall with a support 18, comparable to support 14. The other end of the second bi-metallic element is attached to a hollow shaft 19 at 20. Shaft 19 surrounds the solid pin 10 so as to be freely rotatable relative to it, and further carries a short pointer 23 at its end, which is fixedly secured to it. The inner end of shaft 19 carries a segment 21 via a sleeve 21', journalled for free rotation on shaft 19 and arranged to cooperate, via a stop pin 22, with pointer 23, which is not visible from the outside. As will be described in more detail hereinafter, this arrangement serves for interrupting the supply of energy when a certain boiler water temperature is exceeded.

A length of the inner end 24 of tube 11 is enclosed with clearance by a fitting 25, which is secured in a bore of rear portion 2. Fitting 25 has external threading 26, with which it is screwed into a threaded hole in a mounting fitting 32, likewise surrounding tube 11 with clearance. Fitting 32 has external threading 33, with which it is screwed into a threaded hole formed in the wall of boiler 80. Fitting 32 has a valve 82, loaded by a spring 81. As fitting 25 is screwed into fitting 32, valve 82 is forced into the open position by the end of tube 11. An O-ring 83 provides for sealing between fittings 25 and 32.

There is accordingly a small annular space between tube 11, 24 and fitting 25, into which boiler water can enter freely, and through which it can enter a tube 27 connected to the annular space, and flow into a Bourdon gauge connected to tube 27. Bourdon gauge 28 has one end 29 secured via tube 27 to fitting 25, and cooperates with its other, movable end 30 with a lever 31, which can pivot about a fixed pin 31' mounted on the bottom of rear portion 2. The Bourdon tube, in response to pressure variations in the boiler water, causes lever 31 to pivot for interrupting the supply of energy to the boiler when the pressure in the boiler water becomes less than a given minimum.

Figure 2:
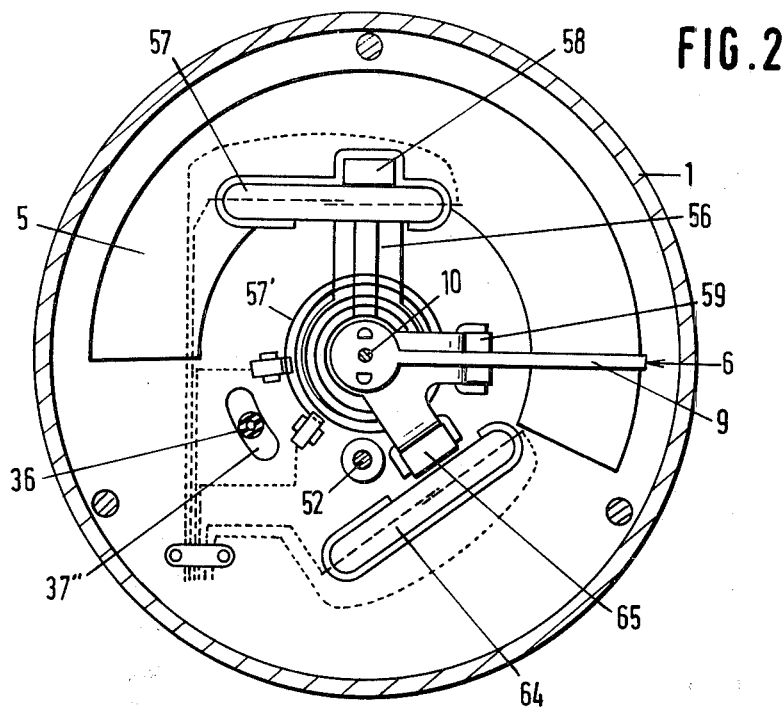
FIG. 2 shows, on a reduced scale, a cross-sectional view on the line II—II of FIG. 1 and seen in the direction of arrows II.
Figure 3:
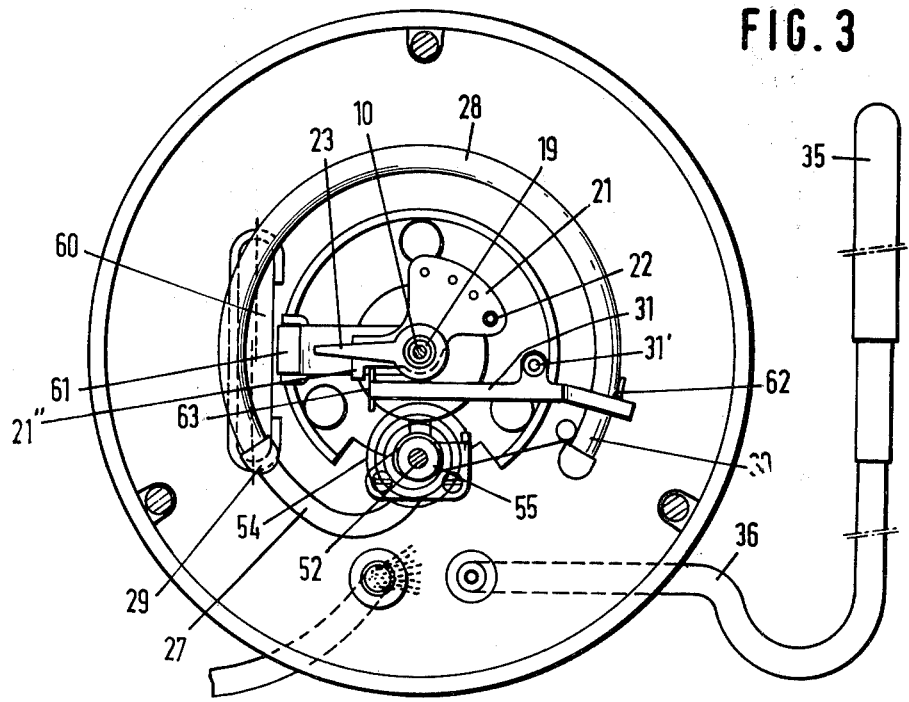
FIG. 3 shows, on a reduced scale, a cross-sectional view of an adjusting knob of an indicator instrument on the line III—III of FIG. 1, and seen in the direction of arrows III.

Disposed on the outside of a building in which the central heating installation with boiler 80 is installed, is a temperature-responsive element 35 (see FIG. 3), taking the form of a hollow tube, closed on one end, and having its other end connected through a capillary, flexible tube 36, passed through gauge box 1, 2, to the inner end of a flat tubular coil spring 37, fitted in a hollow adjusting knob 37' rotatable relative to the front of the front portion 1 of the gauge box. The capillary tube 36 passes the front of the front portion 1 through a slotted opening 37" (see FIG. 2). The whole device is filled with liquid under pressure. When the outside temperature is increased or decreased, the volume of the liquid will expand and contract, respectively, as a result of which spring 37 will become more or less tightly coiled. Spring 37 is secured at its inner end to a fixed central hollow shaft or sleeve 46, while the outer winding of spring 37 can undergo peripheral displacements.

The displacements of the outer winding of the tubular coil spring 37, corresponding to changes in the outside temperature, actuate a pointer 38 in a manner to be described hereinafter, which pointer 38 moves behind window 7, which has graduation 7' printed on the inside thereof, as well as means whose position is determinative of the temperature, the pointer 6 actuacting the switch in the energy circuit, referred to.

Figure 5:
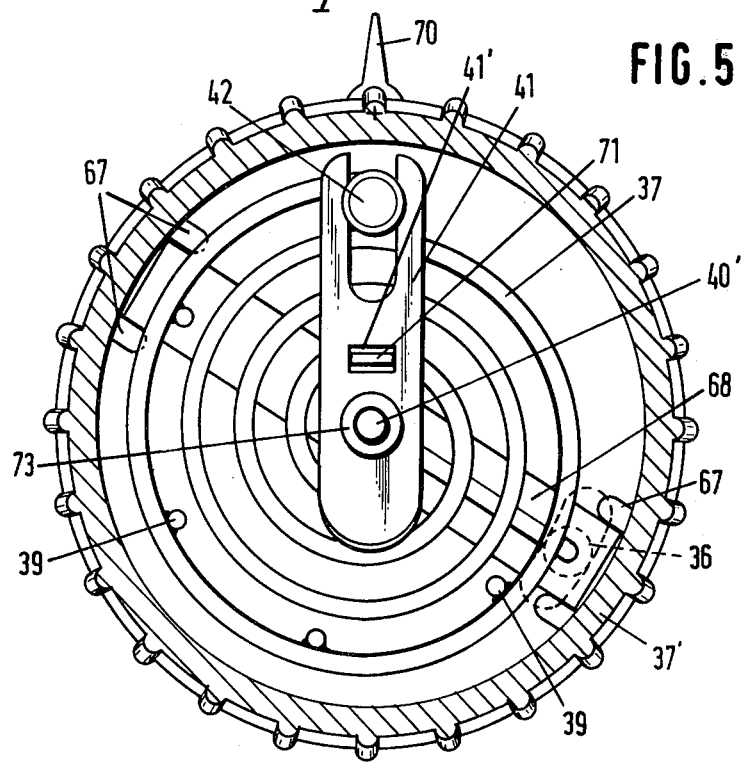
FIG. 5 shows, on a larger scale than the scale of FIG. 1, just the front part of the control device, in cross-sectional view on the line V—V of FIG. 1 and seen in the direction of arrows V.

Spaced along the length of the outer winding of the tube coil spring 37 is a plurality of adjusting pins 39, each of which can be brought into engagement with a spring-biased, liftable tongue 41, which is non-rotatably connected to a rotary, central pin 40 via a cap 42 connected thereto (see FIGS. 1 and 5). The non-rotatable connection of tongue 41 with shaft 40 is realized by providing tongue 41 with an aperture 41', through which an upturned lip 71 of a plate 72 extends, plate 72 being supported on a collar of shaft 40, the collar resulting from the end 40' of shaft 40 being formed with a smaller diameter than the remaining portion of this shaft. A spring 74 located between a ring 73, arranged on upper end 40', and tongue 41 forces plate 72 on to the collar in such a manner that the connection between plate 72 and shaft 40 is restrained from rotation with regard to the operable functional forces. To increase this resistance to rotation, the collar and plate 72 may be provided with cooperating fine teeth. When tongue 41 is slightly lifted against the force of spring 74, tongue 41 and plate 72 may be turned relatively to shaft 40 so that cap 42 may be placed on a different adjusting pin without rotating shaft 40.

In order that tongue 41 may be brought into engagement with a different adjusting pin 39, cover 43 is to be removed from adjusting knob 37'. Cover 43 is detachably fastened with screws 44, screwed into a metal plate 45 engaging under inwardly extending elevations 37''' of knob 37' with a hooked edge 45' formed on part of its periphery.

The inner end of tubular coil spring 37 is coupled for rotation with adjusting knob 37' by being secured by soldering or the like to sleeve 46. Sleeve 46 is coupled for rotation with a rotary strip 68 by means of an integral dog 48, which engages in a recess of strip 68. Strip 68 is fittingly received between a pair of lugs 67 of knob 37'. The rotary position of knob 37' is indicated by pointer 70 on graduation 7'. Pointer 70 is connected to knob 37' via a pin 69, which extends through an arcuate slot formed in the front portion 1.

Shaft 40, which is coaxial with shaft 10, carries at its rear end a coupling element 49, which engages in a counter-coupling element 51, mounted on an intermediate shaft 50. Connected to element 51 is pointer 38, which indicates the rotary position of the outer tube coil spring winding on graduation 7'. Intermediate shaft 50 is also coaxial with shaft 10 and extends between shaft 40 and shaft 10. Shaft 50 is independently rotatable relatively to shaft 10, which has its forward end journalled in shaft 50, which is in turn journalled in dial face 4.

Shaft 50 carries a radial arm 56, on which an electrical switch 57 of the reed type is mounted in the vicinity of its free end. Switch 57 is fed via balance springs 57', 57" arranged at the front and rear sides of arm 56. On the radially outward side of switch 57, arm 56 carries a permanent magnet 58, which can actuate switch 57 in cooperation with a second permanent magnet 59, which is fixedly connected to the long leg 9 of temperature pointer 6 at such a distance from the central axis as to be capable of passing switch 57 on its radially inward side. When, owing to the relative rotation of arm 56 and pointer 6, magnet 59 and magnet 58 come to lie on opposite sides of switch 57, the circuit of switch 57, and hence the supply of energy to the heating means is interrupted. The position of pointer 6, and hence the boiler water temperature at which this interruption is effected, partly depends on the position to which arm 56 has been adjusted by tubular coil spring 37, via tongue 41, shaft 40, coupling elements 49 and 51, and intermediate shaft 50. This position, in turn, depends on the rotary position to which the inner end of spring 37 has been adjusted through rotation of knob 37', which position can be read on graduation 7' by means of pointer 70, as well as on the rotation which the outer end of spring 37 has performed as a result of the pressure prevailing therein of the liquid in the outside temperature sensor 35. The rotation last-mentioned partly depends on the effective length of spring 37, which length can be changed by selecting a different adjusting pin 39 for coupling with tongue 41 via knob 42.

Figure 6:
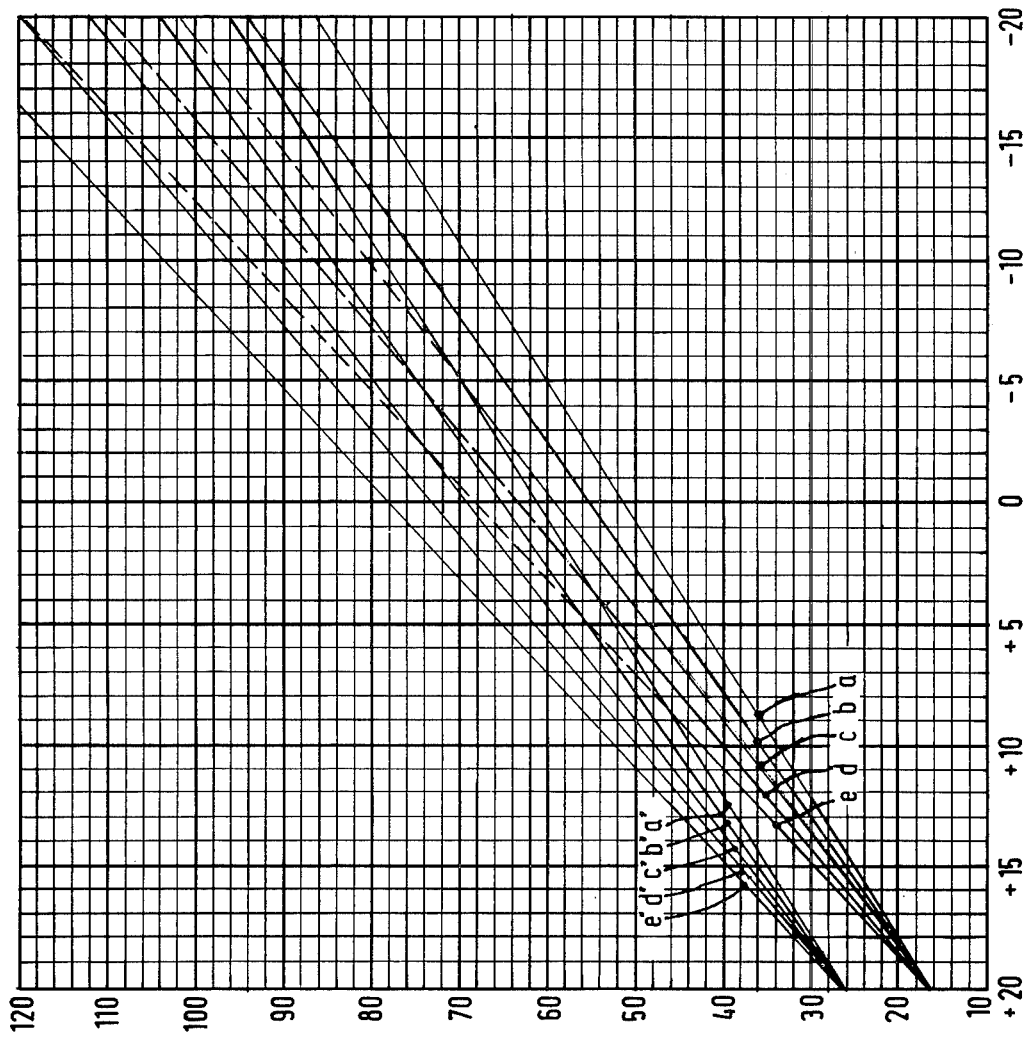
FIG. 6 shows a diagram.

The diagram of FIG. 6 illustrates the possibilities of selecting the control behaviour of the device under the control of the outside temperature. Plotted along the ordinate are the boiler water temperatures to be sensed by the bi-metallic element 12, and on the abscissa the outer temperatures to be sensed by element 35. Lines $a$ to $e$ and $a'$ to $e'$ each give a graphic representation of the combinations of boiler water and outside temperature at which switch 57 is switched. Naturally, the device will effect control at a given adjustment according to one of the lines shown or a different, similar line. By rotating adjusting knob 37', the lines $a$ to $e$ can be displaced to the position of lines $a'$ to $e'$, or an intermediate or further position without changing the angle of inclination of these lines. By selecting a different adjusting pin 39 for coupling with tongue 41, a line with a different angle of inclination can be selected from lines $a$, $a'$ to $e$, $e'$.

The choice of the line will naturally depend on the requirements resulting from the nature of the building to be heated and the desired atmosphere therein. The diagram of FIG. 6 shows that the control device according to the present invention provided a large scope of adaptation to such requirements.

A second electrical circuit comprises a fixedly disposed reed switch 60, which can be actuated by a permanent magnet 61, mounted on an arm 61' of sleeve 21' carrying segment 21, on the other side of shaft 19 carrying sleeve 21' with segment 21 for free rotation thereon, which parts 60, 61, 61' are shown in FIG. 1 turned through 90°. Segment 21 is moved by pointer 23 fixedly supported by hollow shaft 19 connected to bi-metallic element 16, when pointer 23 contacts stop 22. Segment 21 is also turned when the end 63 of lever 31 moved by Bourdon gauge 28, i.e., the end 63 away from end 62 of Bourdon gauge 28, contacts arm 21" of segment 21. Accordingly, the sub-assembly of elements 21, 21", 22, 23, 28, 31, 60, 61, 63, serving as an additional safety device, will respond both at too low a pressure and/or at too low a boiler water temperature, the latter because pointer 23 is turned by the second bi-metal 16.

Provided in a third electrical circuit is a reed switch 64 fixedly disposed at the rear of dial face 4. Switch 64 is actuated by a permanent magnet 65, which is movable tangentially of switch 64 and is likewise carried by leg 9 of pointer 6 (see FIG. 2). Reed switch 64 is for setting the pilot temperature or night temperature adjustment of the boiler water. This temperature may be 20° to 30° C.

Figure 4:
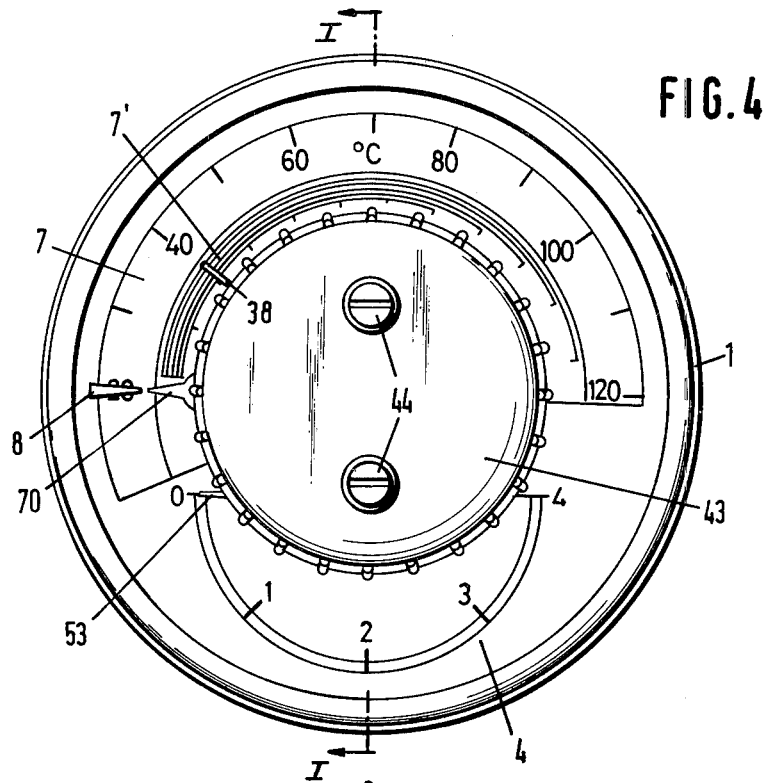
FIG. 4 shows, on a reduced scale, a plan view of the control device.

There is further provided in gauge box 1, 2 a shaft 52, disposed in spaced parallel relationship to the other shafts referred to. Shaft 52 is coupled to Bourdon gauge 28 so that the reaction to variations in boiler water pressure is indicated on dial face 4 with a pointer 53 carried by the forward end of shaft 52, and by means of graduation 53' (see FIGS. 1, 3 and 4). The free end of the Bourdon gauge is coupled to shaft 52 by means of a thin flexible wire tensioned by a coil spring 54, and arranged to be wound on and off a roller 55 on shaft 52.

Figure 7:
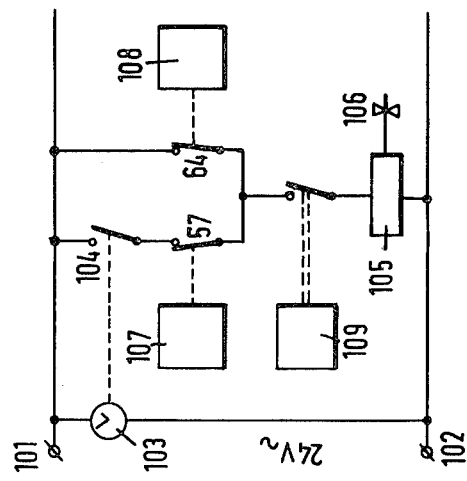
FIG. 7 shows a circuit diagram.

FIG. 7 illustrates the circuit diagram of the control device described, and shows electric conductors 101 and 102, and, connected in series between them a timing clock 103, switches 104, 57, and 60, and an electric magnet 105 which when energized holds fuel valve 106 in the open position. Clock 103 maintains switch 104 closed during the day and open during the night. Switch 57 is controlled by the control unit shown diagrammatically and generally indicated at 107. Unit 107 is under the control of bi-metallic element 12 in cooperation with tubular coil spring 37 for controlling the boiler water temperature between 30° and 110° C. when switches 104 and 60 are in the closed position. When switch 104 is in the open position, the boiler water temperature is controlled to be maintained at a pre-set minimum temperature, e.g., 30° C. through the actuation of switch 64 by the control unit indicated generally at 108, which is under the control of bi-metallic element 12 only. Switch 60, which serves for additional security, is operated by the control unit generally indicated at 109, which opens switch 60 both when the boiler water pressure is too low and when the boiler water temperature is too high in response to Bourdon tube 28 and bi-metallic element 16, respectively.

I claim:

1. A control device for controlling the heating of a hot water boiler comprising:
    a first temperature sensor for sensing the temperature of the boiler water,
    control switch means,
    means actuated by said first temperature sensor for switching said control switch means,
    an outside temperature sensor including a liquid filled reservoir,
    a tubular coiled spring,
    means for communicating said tubular coiled spring and said reservoir,
    said tubular coiled spring having the outer winding thereof movable,
    means responsive to movement of said outer winding for switching said control switch means whereby to vary the temperature at which said control switch means is switched under the control of the first temperature sensor in response to outside temperature,
    said outer winding responsive means comprising means for connection to said outer winding at any one of a plurality of locations along said outer winding.

2. A control device according to claim 1, said tubular coiled spring having an inner winding, and means for adjusting the position of said inner winding to one of a plurality of fixed positions.

3. A control device according to claim 1, said control device comprising first and second movable support means,
    one said support means actuated by said first sensor and the other said support means actuated by said tubular coil spring,
    said control switch means comprising a reed switch supported on one of said support means,
    said control switch means further comprising a magnet supported on the other of said support means.

4. A control device according to claim 3, wherein the reed switch is carried by the support means actuated by said tubular coil spring.

5. A control device according to claim 3, said first temperature sensor is a coiled bi-metallic element, said control device further comprising second switch means, a second coiled bi-metallic element for sensing the temperature of the boiler water,
    means responsive to boiler pressure, and
    means comprising said last mentioned means and said second bi-metallic element for switching said switch means.

6. A control device according to claim 5, wherein the two coiled bi-metallic elements are coaxial, and a pair of telescoping shafts, each connected to a bi-metallic element, and said means for switching said first switch means comprising means connected to one said shaft and means for switching said second switch means comprising means connected to the other said shaft.

7. A control device as set forth in claim 1, wherein said first temperature sensor is a coiled bi-metallic element, a shaft coaxial therewith and connected thereto, and a said movable support means carried by said shaft.

8. A control device as set forth in claim 7, said last mentioned movable support means being rotatable about the axis of said shaft and carrying said reed switch.

* * * * *